United States Patent
Wang et al.

(10) Patent No.: US 6,199,255 B1
(45) Date of Patent: Mar. 13, 2001

(54) APPARATUS FOR DISASSEMBLING AN INJECTOR HEAD

(75) Inventors: Wen-Yi Wang, Hsin-chu; Yi-Kun Chen, Tao-Yuan; Chia-Hsin Lin; Wen-Tsam Chang, both of Hsin-Chu, all of (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/413,655

(22) Filed: Oct. 6, 1999

(51) Int. Cl.[7] .................................................. B23P 19/04
(52) U.S. Cl. ............................................................ 29/239
(58) Field of Search ........................... 29/239, 238, 281.5, 29/233, 266; 269/43

(56) References Cited

U.S. PATENT DOCUMENTS

| | | | |
|---|---|---|---|
| 1,942,463 | * 1/1934 | Williams | 269/43 |
| 2,691,212 | * 10/1954 | Hildebrand | 29/239 |
| 3,866,883 | * 2/1975 | Goransson | 29/239 |
| 4,441,844 | * 4/1984 | Miller | 29/239 |
| 5,848,459 | * 12/1998 | Minick | 29/239 |

* cited by examiner

Primary Examiner—Robert C. Watson
(74) Attorney, Agent, or Firm—Tung & Associates

(57) ABSTRACT

Apparatus for aiding in the disassembly of a mechanical assembly, such as an injector head having a plurality of interconnected, stacked plates. The apparatus includes a stationary base with side walls between which the plates are received to maintain registration of the latter during disassembly. A carriage slideably mounted on the base includes a clamp for clamping the head on the base and means for securing a portion of the head on the carriage such that the head portion moves along with the carriage. Through holes in the side walls allow certain of the plates to be secured to the side walls against movement of the carriage such that upward movement of the carriage separates the plates.

16 Claims, 2 Drawing Sheets

APPARATUS FOR DISASSEMBLING AN INJECTOR HEAD

TECHNICAL FIELD

The present invention broadly relates to jigs and fixtures for holding parts and assemblies, and deals more particularly with apparatus for aiding in the disassembly of a mechanical assembly, such as an injector head.

BACKGROUND OF THE INVENTION

Specialized jigs and fixtures have long been used to aid in holding and manipulating parts and assemblies, often for the purpose of maintaining parts in proper alignment during the assembly or disassembly of a machine or part. Because prior art fixtures are normally custom designed for a particular application, few have universal use.

In connection with complex, highly sophisticated processing equipment used to manufacture semiconductor devices, maintenance of the equipment and parts is particularly critical since such processed involve continuous high volume production which results in wear and build up of processing materials and contaminants which adversely can affect the quality and yield of the process.

Processing chambers used to fabricate semiconductors devices, such as IC wafers, employ means for introducing certain gasses into the chamber that are required to carry out a particular process. For example, one process utilizes a TEOS gas, such as a TMB which uses a boron source, or a TMPI gas which uses a phosphor source. Along with the TEOS gas, $N_2$ or $O_3$ gasses are also introduced into the chamber where they become mixed with the primary TEOS gas. The introduction of these gasses into the chamber is achieved using a specialized injector head which has an input side coupled with sources of the gasses, a manifold like head in which the gasses are conducted into the head, and exit passages for introducing the gasses into the chamber. Injector heads of the type described above comprise a plurality of stacked plates fastened together and sealed from each other by "O" rings. Each of the plates typically includes a longitudinal groove therein through which a particular gas is transported from the inlet side to exit nozzles. These injector heads require periodic preventive maintenance in order to maintain their operation at peak performance. Such maintenance involves disassembling the entire injector head, including disassembling all the plates, cleaning the plates of material buildup and contaminants, and replacing the O-rings, which deteriorate over time, particularly when subjected to toxic gasses. In the past, disassembly of the heads had been performed simply by placing the head on a workbench and removing the fasteners and fittings that secure the plates together. In some cases, the plates and O-rings tend to stick together, and in order to separate the plates, a repair man has resorted to tapping or pounding on parts of the head with a hammer in order to break the plates free from each other. This rather rough, and imprecise handling sometimes results in damage to the plates in the form of scratches, nicks, or indentations which may adversely affect injector head operation or even ruin the head.

Accordingly, there is a clear need in the art for apparatus aiding in the disassembly of the injector heads which overcomes each of the deficiencies discussed above,

BRIEF DESCRIPTION OF THE INVENTION

According to one aspect of the invention, apparatus for aiding in the disassembly of an injector head is provided, wherein the injector head includes a plurality of stacked plates secured together by fasteners. The apparatus includes a base, clamping means for releasably clamping the injector head on the base, a pair of spaced apart side walls extending upwardly from the base and between which the plates may be received so as to maintain them in registration, a carriage mounted for vertical sliding movement on the combination of the base and the side walls, and fastening means for releasably securing the plates to the side walls. The side walls included a plurality of through holes to accommodate releasable fastening of the plates to the side walls. The carriage assembly is vertically moveable relative to the base and side walls, and functions to lift one or more plates to facilitate disassembly of the head. The clamping means is preferably secured on the carriage so as to clamp downwardly on the plates against the base, thereby maintaining the plates in proper registration during disassembly thereof.

According to another aspect of the invention, apparatus is provided for aiding in the disassembly of a mechanical assembly of the type including a plurality of stacked plates secured together. The apparatus includes a base upon which the assembly may be placed, a carriage mounted for a vertical sliding movement relative to the base wherein the carriage includes means for releasably securing a portion of the assembly to the carriage for vertical movement with the carriage, and means carried on the base for releasably securing at least certain of the plates against movement with the carriage.

Accordingly, it is a primary object of the invention to provide apparatus for aiding in the disassembly of a mechanical assembly, such as an injector head which includes a plurality of stacked plates secured together.

Another object of the invention is to provide apparatus as described above which maintains the plates in proper registration with each other during disassembly thereof.

A further object of the invention is to provide apparatus of the type mentioned above which permits disassembly of the injector head without the need for tapping or impacting the plates in order to release them from each other, thereby avoiding unwanted damage to the plates.

A further object of the invention is to provide apparatus as aforementioned which reduces the time required for disassembly of the head and assures that the plates are disassembled according to a standardized procedure.

These, and further objects and advantages of the present invention will be made clear or will become apparent during the course of the following description of a preferred embodiment of the invention.

BRIEF DESCRIPTION OF THE DRAWINGS

In the drawings, which form an integral part of the specification and are to be read in conjunction therewith, along with the appended claims, and wherein like reference numerals are employed to designate identical components in the various views:

DESCRIPTION OF THE PREFERRED EMBODIMENT OF THE INVENTION

Figure 1:
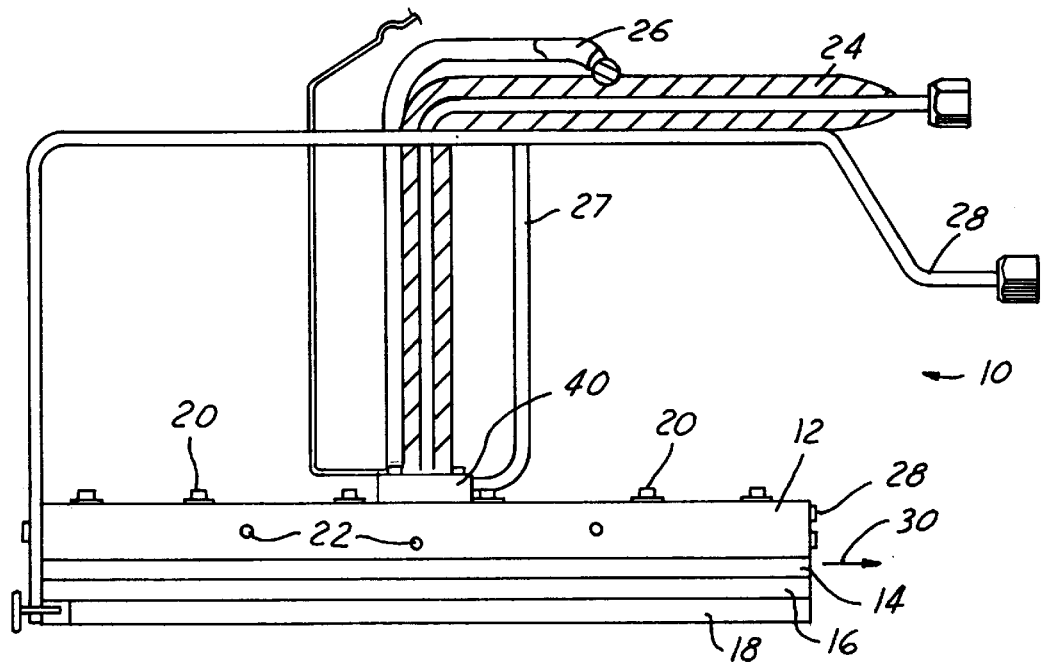
FIG. 1 is a side view of an injector head to be disassembled using the apparatus of the present invention, parts being broken away in sections for clarity.
Figure 2:
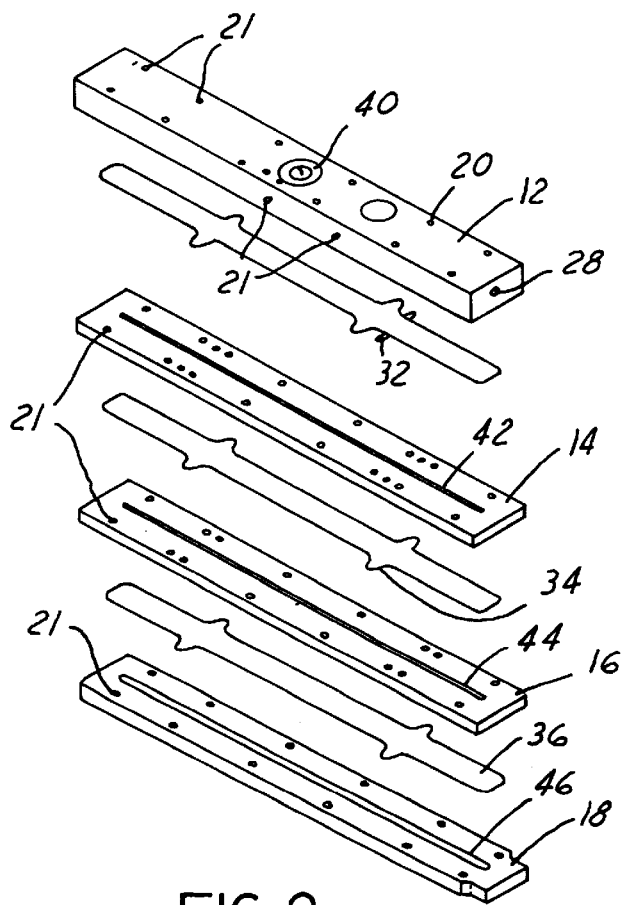
FIG. 2 is an exploded, perspective view of the plates forming a part of the injector head shown in FIG. 1.

Referring first to FIGS. 1 and 2, the present invention relates to apparatus for aiding in the disassembly of a mechanical assembly, such as an injector head, generally indicated by the numeral 10 in FIG. 1. The injector head 10 is used in combination with other equipment for processing semiconductor devices such as the fabrication of semiconductor wafers (not shown). As previously discussed, such processes typically employ a processing chamber within which various type of processes are carried out on the wafers. Such processed may include, by way of example, CVD (chemical vapor deposition), PVD (physical vapor deposition), etching, ion implantation, etc. These processes require the presence of various reactive or inert gases in the chamber which in some cases, must be introduced into the chamber in precisely metered amounts. A device, such as the injector head 10 is employed as the means of introducing such gasses into the chamber.

Injector head 10 includes a plurality of rectangularly shaped, stacked plates 12, 14, 16 and 18, all of which include around the periphery thereof, a plurality of through-holes 21, each adapted to receive a fastener, such as screws 20 therethrough which secure the plates together in face to face, stacked relationship. Plates 14, 16, and 18 respectively include longitudinally extending, centrally located grooves 42–46 therein which act as conduits to direct gas through the head 10 and into the chamber (not shown). The plates 12–18 are sealed together in gas tight relationship by means of O-rings 32, 34, 36 which extend essentially around the perimeter of the plates 14–18 and surround the corresponding grooves 42–46.

The head 10 includes numerous internal passageways (not shown) which are connected with a manifold port 40 extending through the top surface of the plate 12. These passageways route gasses introduced into the port 40 through the plates and into the grooves 42–46. Additionally, the plates 12–18 include passageways for introducing cooling water therethrough, which is delivered from a source (not shown) through a cooling water tube 28. The manifold port 40 has coupled therewith three tubes 24, 26 and 27 each of which has a threaded outer coupling adaptively connected with a source of a selected gas. In one process, for example, tubes 26 and 27 are respectively coupled with sources of $N_2$ and $O_3$, which gasses are respectively delivered into grooves 44, 46. Any of several process gasses, such as TEOS, TMB, or TMPI may be introduced into the tube 24. The gasses introduced into the head 10 by way of the tubes 24, 26, 27 are not mixed within the head 10, but rather simply routed through the above mentioned passageways into the plates 12–18 and are introduced into the chamber through one or more outlet openings, one of such openings being indicated by the numeral 28.

Figure 3:
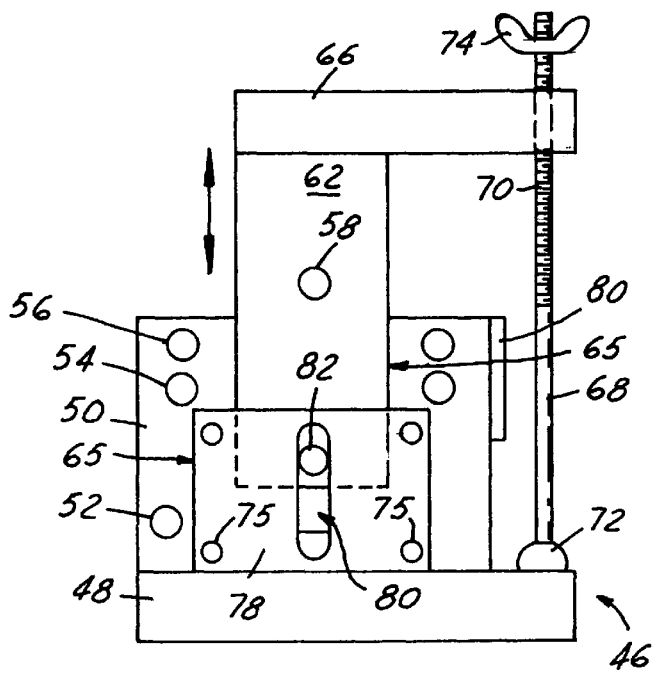
FIG. 3 is a side view of the apparatus which forms the preferred embodiment of the present invention, and is employed to disassemble the injector head in FIG. 1.
Figure 4:
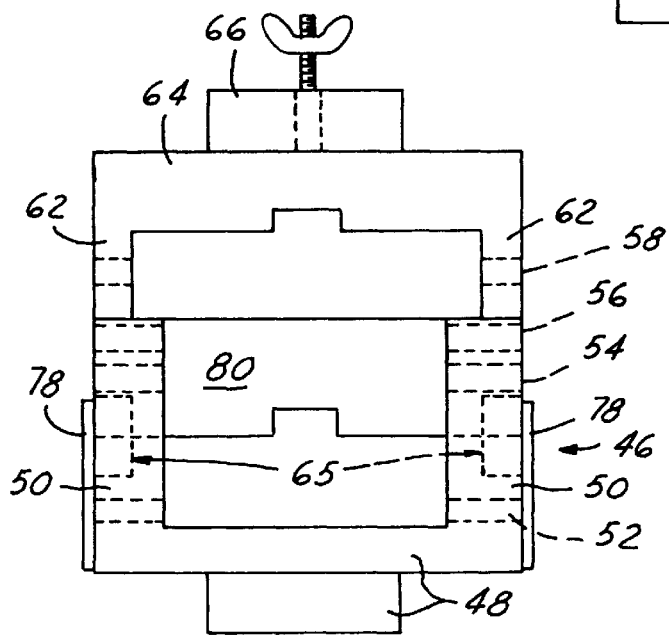
FIG. 4 is a front view of the injector head shown in FIG. 3.
Figure 5:
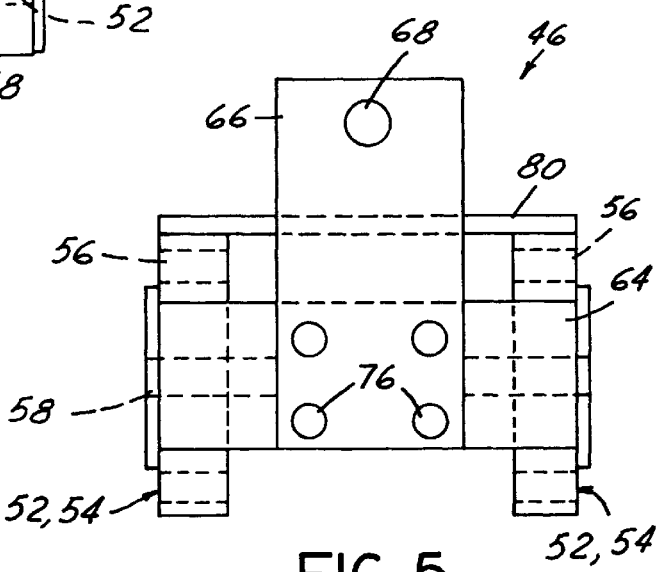
FIG. 5 is a top view of the apparatus shown in FIG. 3.

In the past, preventative maintenance has been performed on the head 10 by disassembling all of its component parts, including the plates 12–18. Disassembly has been performed by a workman using ordinary tools without the aid of any jigs or fixtures. Accordingly, uneven forces can be applied to the component parts during the disassembly process, and parts can even be damaged through rough handling or through the use of excessive force. In accordance with the present invention, apparatus generally indicated by the numeral 46 in FIGS. 3–5 is provided, to aid in the disassembly of the head 10. The apparatus 46 broadly includes a generally rectangular base 48 having along two side thereof outwardly extending generally rectangular side walls 50 which extend parallel to each other and are spaced apart a distance equal to or marginally greater than the width of the plates 12–18. The head 10 is inserted into the apparatus 46 by moving the assembled plates 12–18 between the side walls 50 and on to the base 48. Side walls 50 each include a lower through-hole 52 and two pairs of spaced apart through-holes 54. 56. The vertical elevation of the through-holes 52–56 are selected such that they respectively line up with the side walls of plates 18, 16 and 14, for purposes which will become later apparent.

Mounted for vertical siding movement on the combination of the base 48 and side walls 50 is a carriage assembly 60 (FIG. 4) which comprises a pair of laterally spaced, downwardly extending legs 62 joined together at their upper ends by a cross piece 64. Mounted on top of the cross piece 64 by means of screws 76 is a top member extension 66 which extends rearwardly beyond the back side of the side walls 50. Mounted on the outer end of the extension 66 are clamping means comprising a rod like clamping member 68 provided with a clamping head 72 and a threaded shaft 70 which is threadably received within a threaded opening in the extension 66. A wing nut 74 on the upper end of the clamping member 68 is provided to lock clamping member 68 against rotation, and thus fix the latter end in a plurality of selected clamping positions. Each of the legs 62 includes a centrally located through-hole 58 therein which is vertically adjustable through the movement of the carriage 60, and is intended to be vertically aligned with the side wall of the plate 12.

Each of the side walls 50 includes a vertically extending way 65 defined in the outer face thereof which has a width selected to closely and slideably receive the legs 62 therein. The depth of the ways 65 is such that the outer face of the legs 62 and the outer face of the side walls 50 are essentially flush with each other, i.e. coplanar. In order to retain the leg 62 within the ways 65, an outer retainer plate 78 is provided which is secured to the outside face of the side walls 50 by means of suitable fastener means such as the screws 75. Each of the retainer plates 78 is provided with a vertically extending slot 80 therein through which there is received a guide pin 82 fastened to the leg 62. The guide pin 82 and slot 80 cooperate to assist in guiding a vertical sliding movement of the legs 62 and thus the carriage 60. In order to provide added rigidity to the apparatus 46, a support plate 80 is secured as by welding to the rear faces of the side walls 50.

In use, in order to disassemble the head 10, the head is moved horizontally, in the direction of the arrow 30, (FIG. 1) between the side walls 50 and onto the base 48. As the head is introduced into the apparatus 46, the carriage 60 is moved upwardly such as that the upper plate 12 clears the clamping head 72; if necessary, the height of the clamping head 72 may be adjusted by screwing the clamping member 68 upwardly to an appropriate clearing height. Next, the clamping member 68 is screwed downwardly until the clamping head 72 engages the upper face of the plate 12 and thus clamps the entire set of plates 12–18 firmly against the base 48.

As clamping member 68 is screwed down the clamp plates 12–18, the carriage 60 moves upwardly until the guide pin 82 engages the upper end of slot 80. At this point, the head 10 is firmly clamped in the apparatus 46, and a workman can then begin the disassembly process which commences with removal of the screws 21 which hold the plates 12–18 together. After certain of the fasteners holding the plates 12–18 together are removed, the clamping member 68 may be screwed upwardly, thus causing the carriage 62 to slide downwardly until the through hole 58 are vertically aligned with the side walls of the upper plate 12. At this point, suitable fasteners (not shown) such as screws may be passed through the through holes 58 until they engage the plate 12, thus locking the plate 12 and any of the other plates therewith, to the carriage 60. The carriage 60 is then slid vertically upward to thereby separate the plates 12–18. However, if, as is often the case, the plates 12–18 stick together because of accumulated internal residue or deteriorated O-rings, additional fasteners or holding pins may be inserted into the through holes 52, 54 and 56 and drawn down against the plates 14–18 until the latter are releasably fixed to the stationary side walls 50. At this point, upward sliding movement of the carriage 60 to which plate 12 has been previously fixed, applies an even vertical force to the plates 12–18 which overcomes the adhesive force caused by the residue, until plate 12 is forced to separate from plate 14. Depending upon the desired disassembly procedure, and the order in which the parts are to be separated, fasteners or holding pins can be inserted in certain of the through holes 52–66. For example, the fasteners are normally inserted through holes 52 and 58, then plate 18 is held on the base 48, while plates 12–16 move upwardly with the carriage, as an entire assembly.

From the foregoing, it is apparent that the apparatus for aiding in the disassembly of an injector head as described above not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the scope and contribution of the present invention. Accordingly, it is to be understood that the protection sought and to be afforded hereby shall be deemed to extend to the subject matter claimed in all equivalents thereof fairly within the scope of the invention.

What is claimed is:

1. Apparatus for aiding in disassembling an injector head, said head including a plurality of stacked plates secured together by fasteners, comprising:

a base;

clamping means for releasably clamping said head on said base;

a pair of spaced apart side walls secured to and extending upwardly from said base and between which said plates may be received so as to maintain said plates laterally registered with each other, said side walls including a plurality of through-holes therein at vertically spaced locations respectively associated with said plates;

a carriage mounted for vertical sliding movement on the combination of said base and said side walls, said carriage including a pair of through-holes therein alignable with one of said plates; and fastening means insertable through said through holes in said sidewalls engageable with said plates to hold said plates during the assembly of said head, said carriage being operable to vertically displace one or more of said plates during said disassembly while maintaining said plates in vertically aligned relationship to each other.

2. The apparatus of claim 1, wherein said clamping means includes a clamping member mounted on said carriage.

3. The apparatus of claim 1, wherein:

said carriage includes a pair of spaced apart legs respectively slideably guided on said side walls, and a top member connecting said legs, and said clamping means includes a clamping member mounted on said top member and extending downwardly toward said base.

4. The apparatus of claim 3, wherein said clamping member is mounted on said top member by a threaded connection, wherein turning said clamping member in one rotational direction advances said clamping member into clamping engagement with said head.

5. The apparatus of claim 1, including a way formed in each of said side walls and wherein said carriage includes a pair of legs each slideably received in and guided by one of said ways, a pair of plates respectively secured to said side walls and covering said legs, whereby to retain said legs within said ways.

6. The apparatus of claim 5, wherein each of said plates includes the guide slot therein, and each of said legs includes a guide members thereon, said guide members being slideably confined respectively in said guide slots.

7. The apparatus of claim 1, wherein said carriage includes a pair of spaced apart legs, and a top member connecting said legs, a portion of said top member extending longitudinal beyond said side walls, and said clamping means includes a clamping member mounted on said top member portion and extending downwardly toward said base plate.

8. The apparatus of claim 7, wherein said clamping member includes a threaded coupling with said top member portion, whereby rotation of said clamping member in one direction advances said clamping member toward said plates.

9. Apparatus for aiding in disassembly of the a mechanical assembly, said mechanical assembly including a plurality of stack plates secured together, comprising:

a base upon which said assembly may be placed:

a carriage mounted for vertical sliding movement relative to said base, said carriage including means for releasably securing a portion of said assembly to said carriage for vertical movement with said carriage and a pair of vertically spaced legs and a top connecting the upper ends of said legs, and means carried on said base for releasably securing at least certain of said plates against movement with carriage.

10. The apparatus of claim 9 including clamping means carried on said carriage top for clamping said assembly on said base.

11. The apparatus of claim 9, wherein said releasable securing means includes a pair of side walls secured to and extending upwardly from said base, said side walls being spaced apart a distance such that said plates are closely received therebetween so as to maintain alignment said plates.

12. The apparatus of claim 11, wherein said side walls include through-holes therein respectively registering with said plates, and said releasable securing means includes fastener means passing through said through-holes and engaging said plates.

13. The apparatus of claim 9, wherein said releasable securing means includes a pair a spaced apart walls, and said carriage means includes means for slideably mounting said legs on said walls.

14. The apparatus of claim 13, wherein said mounting means includes a pair of plates respectively secured to said walls, each of said plates having a guide slot therein, and a pair of guide pins on said carriage and respectively received within said guide slots.

15. The apparatus of claim 14, wherein said mounting means includes a pair of vertical ways respectively in said walls and said legs are slideably received within said ways.

16. The apparatus of claim 12, wherein said legs each include a through-hole therein, and said releasable securing means includes fastening means passing through said through-holes in said legs whereby to releasaebly secure at least a portion of said assembly to said carriage such that assembly portion moves vertically with said carriage.

* * * * *